United States Patent
Hallifax et al.

(10) Patent No.: US 6,383,680 B1
(45) Date of Patent: May 7, 2002

(54) WOUND CELL STACK DESIGN FOR ENHANCED BATTERY PERFORMANCE

(75) Inventors: Paul T. Hallifax, Gasport; Dominick J. Frustaci, Williamsville; William M. Paulot, Lancaster; Kenneth P. Moceri, North Tonawanda, all of NY (US); Christine A. Frysz, New Milford, CT (US)

(73) Assignee: Wilson Greatbatch Ltd., Clarence, NY (US)

( * ) Notice: Subject to any disclaimer, the term of this patent is extended or adjusted under 35 U.S.C. 154(b) by 0 days.

(21) Appl. No.: 09/975,268

(22) Filed: Oct. 11, 2001

Related U.S. Application Data

(63) Continuation-in-part of application No. 09/262,245, filed on Mar. 4, 1999, now abandoned.

(51) Int. Cl.[7] .......................... H01M 6/10; H01M 10/36
(52) U.S. Cl. ................. 429/94; 429/211; 429/218.1
(58) Field of Search .................... 429/94, 211, 218.1

(56) References Cited

U.S. PATENT DOCUMENTS

| | | |
|---|---|---|
| 317,487 A | 5/1885 | Barrier et al. |
| 1,076,485 A | 10/1913 | Crowdus |
| 1,269,778 A | 6/1918 | Becker |
| 4,064,725 A | 12/1977 | Hug et al. |
| 4,099,401 A | 7/1978 | Hug et al. |
| 4,112,202 A | 9/1978 | Hug et al. |
| 4,158,300 A | 6/1979 | Hug et al. |
| 4,212,179 A | 7/1980 | Juergens |
| 4,637,966 A | 1/1987 | Uba et al. |
| 4,761,352 A | 8/1988 | Bakos et al. |
| 4,802,275 A | 2/1989 | Freluche |
| 5,021,306 A | 6/1991 | Sauer et al. |
| 5,045,086 A | 9/1991 | Juergens |
| 5,091,273 A | 2/1992 | Hug et al. |
| 5,116,698 A | 5/1992 | Sears |
| 5,323,527 A | 6/1994 | Ribordy et al. |
| 5,370,711 A | 12/1994 | Audit et al. |
| 5,439,488 A | 8/1995 | Audit et al. |
| 6,007,938 A | 12/1999 | Blancheton |

FOREIGN PATENT DOCUMENTS

| | | |
|---|---|---|
| EP | 0 136 886 A2 | 10/1985 |
| EP | 0 512 828 A1 | 11/1992 |
| GB | 1088271 | 10/1967 |
| GB | 1088272 | 10/1967 |

*Primary Examiner*—John S. Maples
(74) *Attorney, Agent, or Firm*—Hodgson Russ LLP

(57) ABSTRACT

An electrochemical cell comprising an electrode assembly in which overlayed electrodes are wound together in a bi-directional fashion yielding a high energy density cell stack with low internal impedance is described. The overlayed electrodes are such that either a single cathode is paired with two anodes or a single anode is paired with two cathodes prior to winding of the cell stack assembly. For example, the electrode assembly is formed by overlapping the two anode electrodes on opposite sides of the cathode electrode across a midportion and then winding the electrode strips bi-directionally about the midportion.

18 Claims, 5 Drawing Sheets

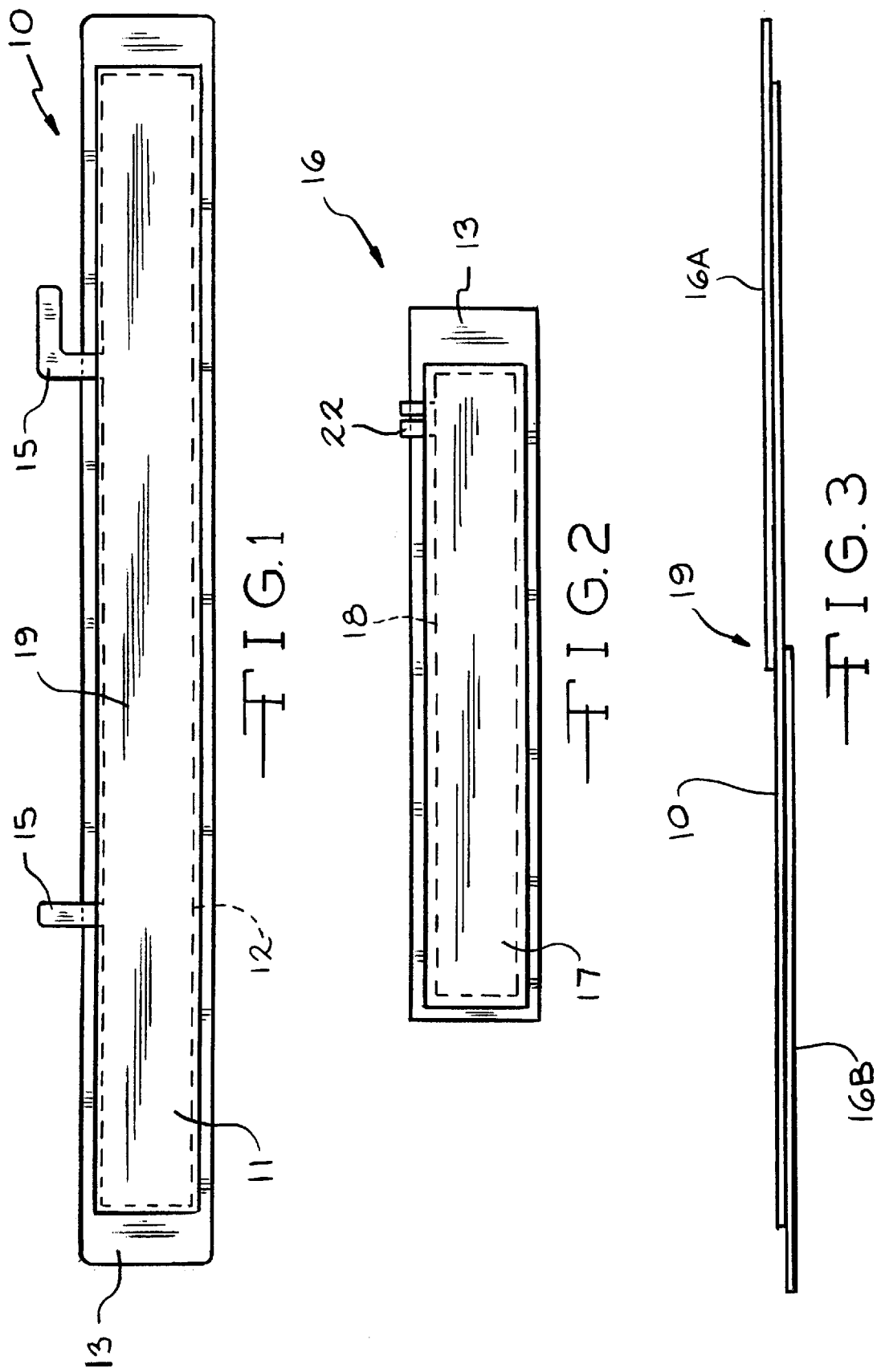

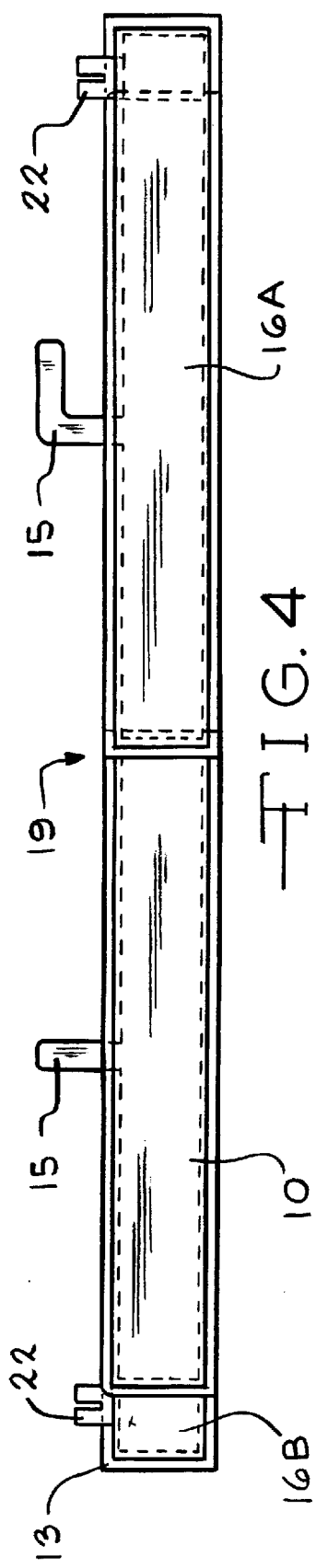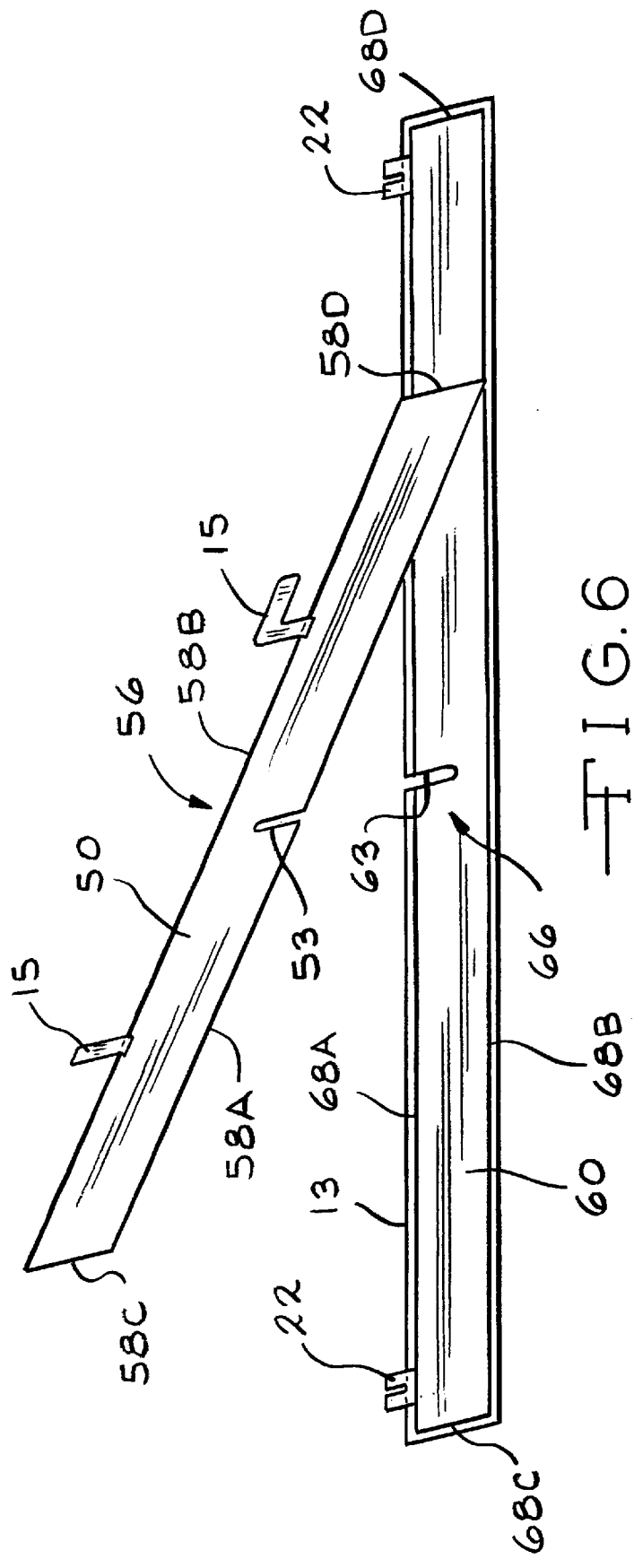

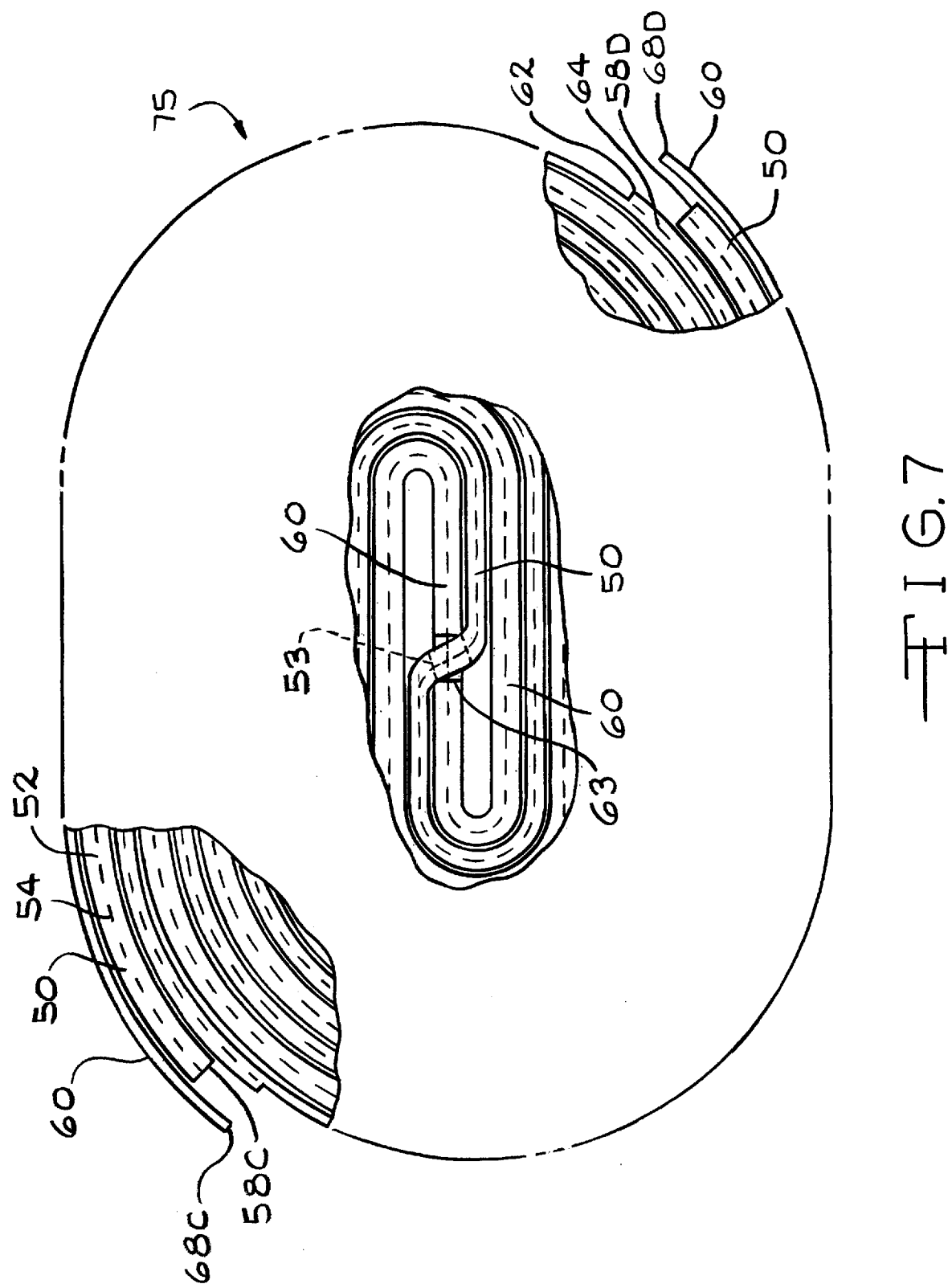

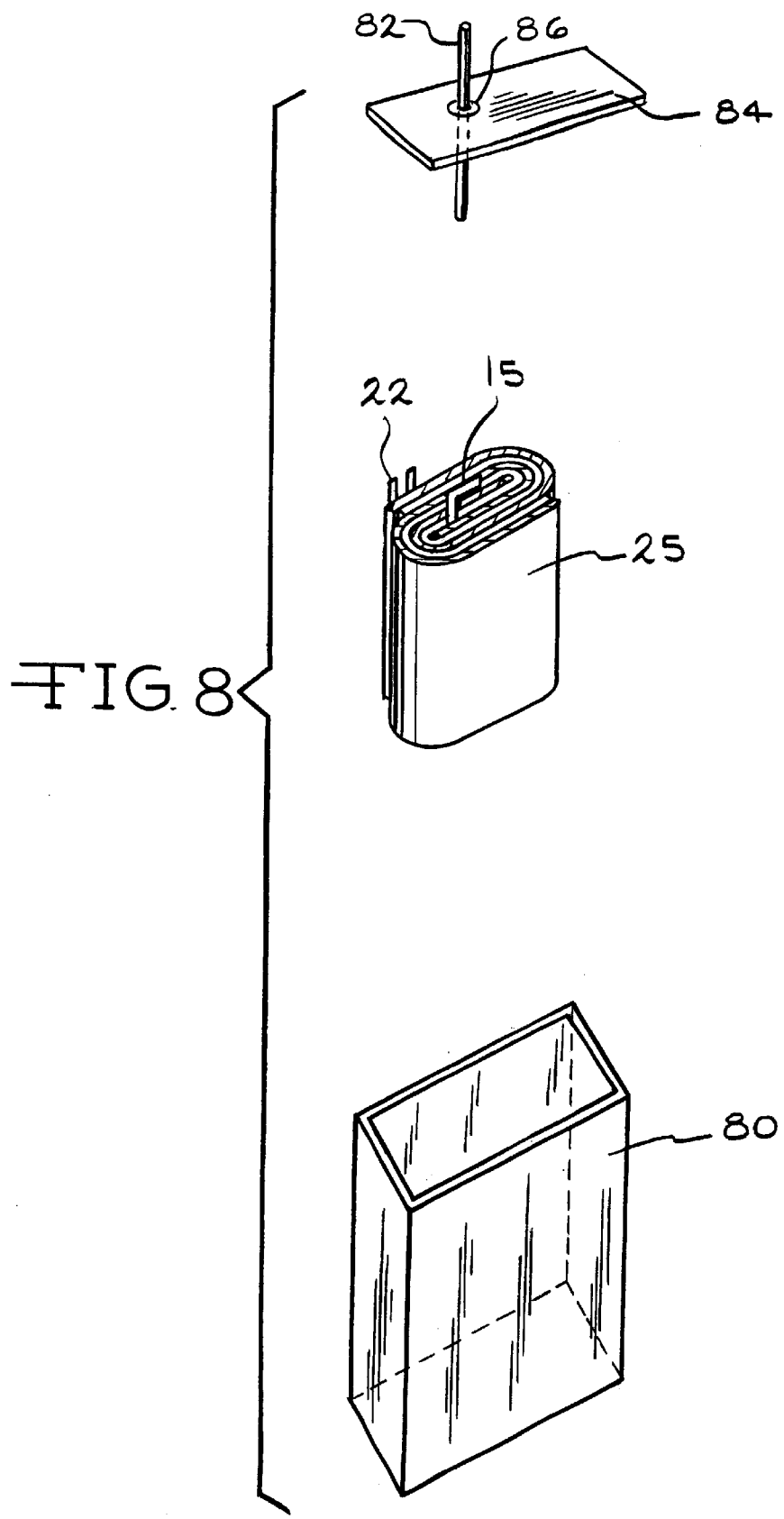

WOUND CELL STACK DESIGN FOR ENHANCED BATTERY PERFORMANCE

CROSS-REFERENCE TO RELATED APPLICATION

The present application is a continuation-in-part application of Ser. No. 09/262,245, filed Mar. 4, 1999, now abandoned.

FIELD OF INVENTION

The present invention generally relates to the art of electrochemical energy, and more particularly, to an electrode assembly, electrochemical cells in which the electrode assembly is used, and a method for making the electrode assembly.

BACKGROUND OF THE INVENTION

Batteries or electrochemical cells are typically volumetrically constrained systems that cannot exceed the available volume of the battery case. The size and resulting volume of the battery case are dictated by the space requirements available for the particular application. The components that make up a battery, namely, the cathode electrode, the anode electrode, the separator, the current collectors, and the electrolyte all have to fit into the limited space defined by the battery case. Therefore, the arrangement of the components impacts on the amount of active electrode material that can be fit into the case and the ease of manufacturing the unit.

Some typical electrode assemblies include the "Z" folded electrode assembly that is disclosed in U.S. Pat. No. 3,663,721 to Blondel et al. In the "Z" folded electrode, a unitary and continuous lithium anode is folded back and forth in a zigzag fashion. The length of the individual folds determines the width of the electrode assembly. Individual cathode plates are positioned between pairs of the pleated anode electrode and electrically connected to one another. The design has some drawbacks, including the requirement that separate cathode plates be inserted between each pair of adjacent layers of anode electrode and the requirement that electrical connections be made between all of the inserted cathode plates. This arrangement increases the time and costs associated with manufacturing.

Another typical electrode assembly configuration is the "jelly roll" design in which the anode electrode, the cathode electrode, and the separator are overlaid with respect to each other and coiled up. Such an electrode configuration is desirable because the continuous anode and cathode electrodes require a minimal number of mechanical connections to their respective terminal leads, and the jelly roll assembly is generally recognized as preferred for high discharge and current pulse applications. However, in some applications, a cylindrically shaped electrode assembly is not desired because of other factors, such as the shape of the battery case.

U.S. Pat. No. 4,761,352 to Bakos et al. discloses yet another electrode assembly design comprising an accordion folded electrode assembly with unitary members for both the anode and cathode strips. The cathode strip is approximately half the length of the anode strip, and the anode strip is folded over the cathode strip to "sandwich" the cathode between two layers of the anode. The resulting form is then manually folded in an alternating series of "V" folds (best shown in FIG. 4 of the patent). However, that design provides some undesirable gaps which reduce the volumetric density of the electrochemically active materials.

What is needed is an improved multi-layer, folded electrode assembly design for high energy devices that includes many of the desirable features of the jelly roll design, such as unitary anode and cathode electrodes.

SUMMARY OF THE INVENTION

The present invention fills the above-described need by providing an electrochemical cell comprising an electrode assembly in which the electrodes are wound together in a bi-directional fashion, yielding a high energy density cell with low internal impedance. The anode and cathode electrodes are arranged in the cell in such a fashion that provides efficient utilization of the active components. The resultant wound assembly is configured such that it can be conveniently packaged in either a cylindrical or prismatic housing.

In one embodiment of the electrochemical cell, the electrodes are provided as two anode assemblies and one cathode assembly configured such that each anode is positioned on either side of the cathode assembly, and extending in opposing directions. At the center most portion of the assembly there is an overlap of anodes. This assembly is then wound about the overlapping region in a bi-directional fashion. The resultant assembly produces a wound cell stack configuration with a uniform contact of anode and cathode, such that the cell is balanced electrochemically and provides for optimum volume utilization within the battery enclosure. Each anode has one or more tabs that can be welded to the case. Alternately, two cathode assemblies can be paired with one anode assembly, with a resultant cathode tab welded to the case. In both of the above configurations, the opposite electrode may contain one or more tabs which are then electrically connected to the battery feedthrough pin.

An alternate embodiment of this invention provides for an anode electrode and a cathode electrode, wherein the electrodes are slotted. The electrodes are inserted, one into the other, essentially forming an "X". Upon collapsing the electrodes, a variation of the above-described invention is obtained wherein the anode is approximately equally disposed on opposite sides of the cathode, radiating outwardly from its midportion. This assembly is then wound from the center, resulting in a preferred cell stack assembly. This configuration provides for the additional advantage of having the anode registered to the cathode, and mitigates the need for aligning two distinct anodes to the cathode.

Other features and advantages of the present invention will become apparent upon reading the following detailed description of embodiments of the invention, when taken in conjunction with the accompanying drawings and the appended claims.

BRIEF DESCRIPTION OF THE DRAWINGS

FIG. 1 is a side elevational view of the cathode strip and separator of the present invention;

FIG. 2 is a side elevational view of the anode strip and separator of the present invention;

FIG. 3 is a bottom plan view of the cell stack assembly of the present invention;

FIG. 4 is a side elevational view of the cell stack assembly of the present invention;

FIG. 6 is a perspective view of an alternate embodiment of the electrode strips of the present invention;

FIG. 7 is a partial plan view of the wound electrode assembly of the alternative embodiment; and FIG. 8 is an exploded view of an electrochemical cell of the present invention.

DETAILED DESCRIPTION OF THE PREFERRED EMBODIMENTS

Figure 5:
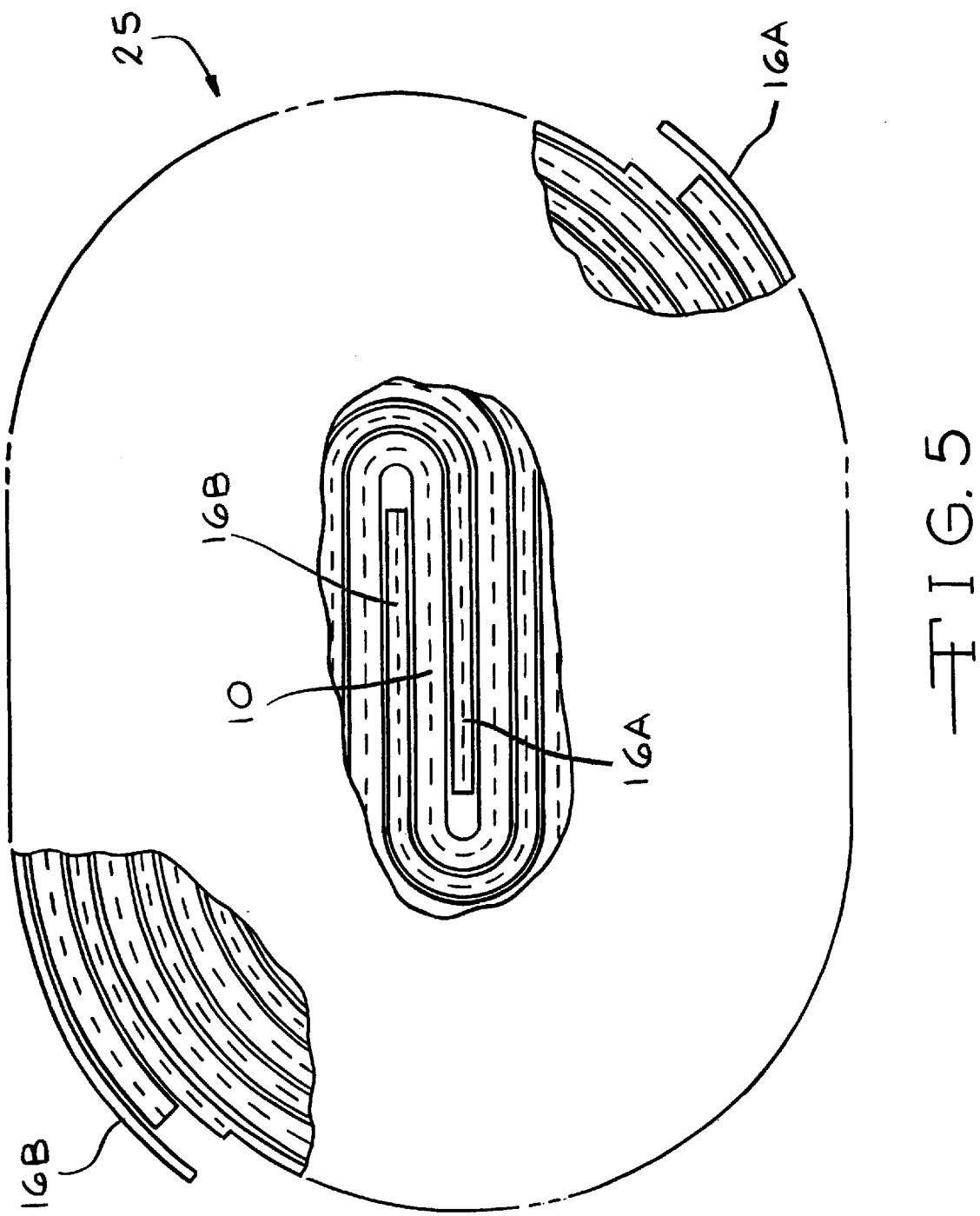
FIG. 5 is a partial plan view of the wound electrode assembly of the present invention.

The present invention is designed for high energy devices such as batteries and capacitors and is adaptable in a wide variety of electrode configurations and shapes for applications as capacitors and batteries, including aqueous and nonaqueous primary and secondary batteries.

Referring to FIG. 1, a first electrode 10 is preferably a continuous structure comprising an active material 11 contacted to a current collector 12 (shown in dashed lines). The active material for a cathode electrode is preferably comprised of a metal, a metal oxide, a metal sulfide, a mixed metal oxide, a carbonaceous material, or the like and is combined with the current collector of a conductive material such as a conductive screen. For an anode electrode, the preferred active material is an alkali metal selected from Group 1A of the Periodic Table of Elements and contacted to an anode current collector. A preferred anode electrode comprises lithium contacted to a nickel current collector. In a preferred form of the present invention, the electrode strip 10 is a cathode electrode having a set of cathode tabs 15 provided for making an electrical connection to a positive terminal.

Turning to FIGS. 2 and 3, a second electrode 16 includes a pair of second electrode strips of a second electrode active material 17 contacted to a current collector 18 (shown in dashed lines) disposed on opposite sides of the first electrode 10. The second electrode strips 16 overlap along a midportion 19 of the first electrode 10 (FIG. 3). Preferably, the second electrode strips 16 are part of the anode electrode. The anode electrode strips 16 have anode tabs 22 that provide for electrical connection to a negative terminal.

As shown in FIGS. 1, 2 and 4, a separator material 13 is disposed behind each elect-rode to prevent contact between overlayed layers of electrodes. Alternatively, the separator 13 is disposed in front of each electrode strip. In a preferred embodiment, which is not shown in the drawings, a separator 13 in the form of an envelope encapsulates each of the first and second electrodes 10, 16. In that respect, whether the separator 13 is disposed between immediately adjacent electrode strips or, the separator serves as an envelope encapsulating at least one of the electrodes, the separator must prevent direct physical contact between the electrodes 10, 16.

Turning to FIG. 4, an electrode assembly according to the present invention comprises a cathode electrode 10 and two anode electrodes 16A, 16B, which are each preferably elongate, flat, and rectangular. The anode electrodes 16A, 16B are disposed on opposite sides of the cathode 10 and aligned such that they overlap across the midportion 19 thereof. The anode electrodes 16A, 16B are a little more than half the length of the cathode electrode 10, and extend a short distance across the midportion 19 in order to overlap. Alternately, two cathode electrode assemblies are paired with one anode electrode in a similar overlapping configuration.

From the alignment shown in FIGS. 3 and 4, the electrode strips 10 and 16 are then folded about the overlapping region in a bi-directional fashion to provide the electrode assembly 25. As shown in FIG. 5, those portions of anode strips 16A and 16B on the outside of the assembly 25 have the outside of the current collector devoid of anode active material. This is because there is no opposing cathode active material, and such anode active material would provide very little, if any, additional volumetric efficiency. Also, the ends of the anode strips 16A and 16B extend somewhat beyond the end of the cathode electrode 10 to fully utilize the discharge efficiency of the cathode electrode.

The term bi-directional refers to the fact that one side is folded downwardly and the opposite side is folded upwardly, either in succession or simultaneously, to generate the electrode assembly 25 shown in FIG. 5. The electrode assembly 25 produces a wound cell stack configuration with uniform contact of anode and cathode electrodes such that the cell is balanced electrochemically and provides for optimum volume utilization within the battery enclose.

An alternate embodiment of the present invention is shown in FIGS. 6 and 7. In this embodiment, a cathode electrode strip 50 comprising a cathode active material 52 contacted to a cathode current collector 54 has a downwardly facing slot 53 disposed in a midportion 56 thereof. An anode electrode strip 60 comprises an anode active material 62 contacted to an anode current collector 64 and includes an upwardly facing slot 63 disposed in a midportion 66. The strips 50 and 60 are moved together with the slots 53, 63 registering with each other to form a collapsible X-shaped assembly. In this embodiment, the anode strip 60 extends outwardly a small distance past the opposed ends of the cathode strip 50 and in a configuration such that the electrodes 50, 60 radiate outwardly from the midportions 56, 66 of the other electrode. The electrode strips 50, 60 are then folded in a bi-directional fashion from the center or midportions 56, 66 to produce the wound electrode assembly 75 shown in FIG. 7. The bi-directional folding is similar to that described with respect to the electrode assembly 25 shown in FIGS. 1 to 5.

The completed electrode assembly 75 shown in FIG. 7 is similar to the electrode assembly 25 in the respect that those portions of anode strip 60 on the outside of the assembly have the outside of the current collector devoid of anode active material. As previously explained, this is because there is no opposing cathode active material there, and such anode active material would provide very little, if any, additional volumetric efficiency. Also, the ends of the anode strip 60 extend somewhat beyond the respective ends of the cathode strip 50 to fully utilize the discharge efficiency of the cathode electrode. This alternate embodiment provides the additional advantage of having the anode registered to the cathode and mitigates the need for aligning two distinct anodes to the cathode.

The present electrode assemblies 25, 75 provide several advantages to cell design, including high energy density with low internal impedance. Additionally, the anode and cathode electrodes 10, 16 for assembly 25 and the electrodes 50, 60 for assembly 75 are arranged in the cell in a way that provides efficient utilization of the active components. The resultant wound cell stacks are configured such that they can be conveniently packaged in either a cylindrical or prismatic shaped casing. These casing shapes are well known to those of ordinary skill in the art. The electrode assemblies 25, 75 also provide a cell stack construction in which the anode and cathode are uniformly utilized during cell discharge. Finally, the assemblies 25, 75 provide a cell having a relatively high inter electrode surface area which results in a high current rate capability. This is advantageous for use in applications such as powering an implantable defibrillator.

A preferred primary electrode chemistry for the electrode assemblies 25, 75 according to the present invention has the first electrode 10, 50 of a mixed metal oxide such as silver vanadium oxide (SVO), copper silver vanadium oxide (CSVO) or a fluorinated carbonaceous material ($CF_x$), and the second electrode 16, 60 comprising lithium. A Li/SVO or Li/CSVO electrochemical couple is activated with an electrolyte of 0.25 M to 1.5 M $LiAsF_6$ or $LiPF_6$ in a 50:50, by volume, mixture of propylene carbonate and 1,2-dimethoxyethane. For a $Li/CF_x$ cell, the preferred electrolyte is 1.0 M to 1.4 M $LiBF_4$ in γ-butyrolactone. A preferred secondary chemistry has a carbonaceous negative electrode and a lithiated counter electrode. A preferred lithiated material is lithium cobalt oxide. This couple is activated with an electrolyte of 1 M $LiPF_6$ or 1 M $LiAsF_6$ in ethylene carbonate/1,2-dimethoxyethane (3:7).

Referring to FIGS. 1, 2 and 8, the anode tabs 22 can be welded to the case 80 (negative). Alternately, two cathode assemblies can be paired with one anode assembly with the resultant cathode tabs (not shown) welded to the case 80 (positive). In both of the above configurations, the opposite electrode may contain one or more tabs (cathode tabs 15) that are electrically connected to the battery feedthrough or terminal pin 82. The terminal pin 82 is electrically insulated from the lid 84 of the casing 80 by a glass-to-metal seal 86. Similar electrical connections for the cathode strip 50 and the anode strip 60 are made for the electrode assembly 75 shown in FIGS. 6 and 7.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention, as defined by the appended claims.

What is claimed is:

1. An electrode assembly, comprising:
   a) a first electrode strip having a midportion and a predetermined first length;
   b) at least two second electrode strips having a second length shorter than the first length, wherein the at least two second electrode strips are disposed on opposite sides of the first electrode strip and in an overlapping fashion along the midportion of the first electrode strip, and
   c) a separator material disposed between the first electrode strip and the at least two second electrode strips, wherein the first electrode strip and the at least two second electrode strips bi-directionally foldable about the midportion of the first electrode strip such that a wound cell stack is formed.

2. The electrode assembly of claim 1 wherein the at least two second electrode strips each have at least one tab for connection to a battery case.

3. The electrode assembly of claim 1 wherein the first electrode strip has a tab connectable to a terminal pin.

4. The electrode assembly of claim 1 wherein the first electrode strip comprises an anode electrode and the at least two second electrode strips comprise a cathode electrode.

5. The electrode assembly of claim 1 wherein the first electrode strip comprises a cathode electrode and the at least two second electrode strips comprise an anode electrode.

6. The electrode assembly of claim 1 wherein the first electrode strip is a unitary member.

7. The electrode assembly of claim 1 wherein the at least two second electrode strips are unitary members.

8. The electrode assembly of claim 1 of either a primary or a secondary chemistry.

9. The electrode assembly of claim 1 wherein the first electrode strip is of a first electrode active material selected from the group consisting of SVO, CSVO and $CF_x$, and the at least two second electrode strips are of a second electrode active material comprising lithium.

10. The electrode assembly of claim 1 wherein the first electrode strip is of a first electrode active material comprising lithium cobalt oxide, and the at least two second electrode strips are of a second electrode active material comprising a carbonaceous material.

11. An electrochemical cell, comprising:
    (a) a cathode strip comprising a cathode active material contacted to a cathode current collector and having a midportion and a predetermined first length;
    (b) at least two anode strips comprising lithium contacted to an anode current collector and having a second length shorter than the first length, wherein the at least two anode strips are disposed on opposite sides of the cathode strip in an overlapping fashion along the midportion of the cathode strip;
    (c) a separator material disposed between the cathode strip and the at least two anode strips; and
    (d) an electrolyte activating and operatively associating the cathode strip and the anode strips, wherein the cathode strip and the anode strips are bi-directionally foldable about the midportion of the cathode strip to form a wound cell stack.

12. The electrochemical cell of claim 11 wherein the at least two anode strips each have at least one tab for connection to a battery case.

13. The electrochemical cell of claim 11 wherein the cathode strip has a tab connectable to a terminal pin.

14. The electrochemical cell of claim 11 of either a primary or a secondary chemistry.

15. The electrochemical cell of claim 11 wherein the cathode active material of the cathode strip is selected from the group consisting of SVO, CSVO and $CF_x$, and the anode active material of the at least two anode strips comprises lithium.

16. The electrochemical cell of claim 11 wherein the cathode active material of the cathode strip comprises lithium cobalt oxide, and the anode active material of the at least two anode strips comprises a carbonaceous material.

17. The electrochemical cell of claim 11 wherein the cathode strip is a unitary member.

18. The electrochemical cell of claim 11 wherein the at least two anode strips are unitary members.

* * * * *